United States Patent
Guichard et al.

(10) Patent No.: US 9,806,962 B2
(45) Date of Patent: *Oct. 31, 2017

(54) DETERMINING THE OPERATIONS PERFORMED ALONG A SERVICE PATH/SERVICE CHAIN

(71) Applicant: Cisco Technology, Inc., San Jose, CA (US)

(72) Inventors: James Guichard, New Boston, NH (US); Carlos M. Pignataro, Raleigh, NC (US); David Ward, Los Gatos, CA (US); Paul Quinn, San Francisco, CA (US); Surendra Kumar, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/223,235

(22) Filed: Jul. 29, 2016

(65) Prior Publication Data

US 2016/0337209 A1    Nov. 17, 2016

Related U.S. Application Data

(63) Continuation of application No. 13/912,224, filed on Jun. 7, 2013, now Pat. No. 9,444,675.

(51) Int. Cl.
*H04L 1/00* (2006.01)
*H04L 12/24* (2006.01)
(Continued)

(52) U.S. Cl.
CPC ...... *H04L 41/5009* (2013.01); *H04L 41/0654* (2013.01); *H04L 41/0668* (2013.01);
(Continued)

(58) Field of Classification Search
CPC ............ H04L 41/5009; H04L 41/0654; H04L 41/0668; H04L 41/5038; H04L 41/5077;
(Continued)

(56) References Cited

U.S. PATENT DOCUMENTS 5,825,772 A    10/1998  Dobbins et al.
6,687,226 B1    2/2004   Galyas
(Continued)

OTHER PUBLICATIONS

Rosen, et al., "BGP/MPLS IP Virtual Private Networks (VPNs)," Network Working Group, RFC 4364, Feb. 2006, pp. 1-47.
(Continued)

*Primary Examiner* — Kevin Mew
(74) *Attorney, Agent, or Firm* — Edell, Shapiro & Finnan, LLC

(57) ABSTRACT

Presented herein are techniques performed in a network comprising a plurality of network nodes each configured to apply one or more service functions to traffic that passes the respective network nodes in a service path. At a network node, an indication is received of a failure or degradation of one or more service functions or applications applied to traffic at the network node. Data descriptive of the failure or degradation is generated. A previous service hop network node at which a service function or application was applied to traffic in the service path is determined. The data descriptive of the failure or degradation is communicated to the previous service hop network node.

20 Claims, 12 Drawing Sheets

(51) Int. Cl.
  *H04L 12/26* (2006.01)
  *H04L 12/703* (2013.01)
  *H04L 12/725* (2013.01)
  *H04L 12/723* (2013.01)
  *H04L 29/08* (2006.01)

(52) U.S. Cl.
  CPC ...... *H04L 41/5038* (2013.01); *H04L 41/5077* (2013.01); *H04L 43/0823* (2013.01); *H04L 43/50* (2013.01); *H04L 45/28* (2013.01); *H04L 45/302* (2013.01); *H04L 45/50* (2013.01); *H04L 67/10* (2013.01)

(58) Field of Classification Search
  CPC ..... H04L 43/0823; H04L 43/50; H04L 43/28; H04L 43/302; H04L 67/10
  See application file for complete search history.

(56) References Cited

U.S. PATENT DOCUMENTS

| | | | |
|---|---|---|---|
| 6,985,488 | B2 | 1/2006 | Pan et al. |
| 7,197,008 | B1 | 3/2007 | Shabtay et al. |
| 7,298,693 | B1 | 11/2007 | Owens et al. |
| 7,457,248 | B1 | 11/2008 | Ali et al. |
| 7,480,283 | B1 | 1/2009 | Sylvain |
| 7,558,261 | B2 | 7/2009 | Arregoces et al. |
| 7,571,470 | B2 | 8/2009 | Arregoces et al. |
| 7,610,375 | B2 | 10/2009 | Portolani et al. |
| 7,643,468 | B1 | 1/2010 | Arregoces et al. |
| 7,657,940 | B2 | 2/2010 | Portolani et al. |
| 7,804,767 | B1 | 9/2010 | Owens et al. |
| 7,827,256 | B2* | 11/2010 | Phillips ............... G06F 8/67 709/220 |
| 7,895,425 | B2 | 2/2011 | Khalid et al. |
| 7,983,174 | B1 | 7/2011 | Monaghan et al. |
| 8,150,963 | B2 | 4/2012 | Baek et al. |
| 8,254,272 | B1* | 8/2012 | Vasseur ............ H04L 41/0677 370/236.2 |
| 8,311,045 | B2 | 11/2012 | Quinn et al. |
| 8,369,330 | B2 | 2/2013 | Allan et al. |
| 8,442,043 | B2 | 5/2013 | Sharma et al. |
| 8,532,087 | B2 | 9/2013 | Kojima et al. |
| 8,634,314 | B2* | 1/2014 | Banka ............... H04L 67/125 370/235 |
| 8,670,326 | B1* | 3/2014 | Balasubramanian ... H04L 45/22 370/238 |
| 9,008,511 | B2 | 4/2015 | Lin et al. |
| 2001/0033548 | A1 | 10/2001 | Saleh et al. |
| 2003/0193944 | A1 | 10/2003 | Sasagawa |
| 2005/0089016 | A1 | 4/2005 | Zhang et al. |
| 2005/0201278 | A1 | 9/2005 | Banerjee et al. |
| 2006/0092950 | A1 | 5/2006 | Arregoces et al. |
| 2006/0095960 | A1 | 5/2006 | Arregoces et al. |
| 2006/0203720 | A1 | 9/2006 | Kano |
| 2007/0201374 | A1 | 8/2007 | Qing et al. |
| 2007/0237147 | A1 | 10/2007 | Quinn et al. |
| 2007/0286204 | A1 | 12/2007 | Ould-Brahim |
| 2008/0049621 | A1 | 2/2008 | McGuire et al. |
| 2008/0049631 | A1* | 2/2008 | Morrill ............... H04L 41/5009 370/250 |
| 2008/0052393 | A1* | 2/2008 | McNaughton ........ H04L 12/66 709/224 |
| 2008/0052628 | A1* | 2/2008 | Bugenhagen ....... H04L 41/0896 715/736 |
| 2008/0120394 | A1 | 5/2008 | Yokoyama et al. |
| 2008/0177896 | A1 | 7/2008 | Quinn et al. |
| 2008/0225857 | A1 | 9/2008 | Lange |
| 2008/0229025 | A1* | 9/2008 | Plamondon ......... G06F 12/0862 711/126 |
| 2009/0037713 | A1 | 2/2009 | Khalid et al. |
| 2009/0262651 | A1 | 10/2009 | Liu |
| 2009/0304010 | A1 | 12/2009 | Kurebayashi et al. |
| 2009/0323522 | A1 | 12/2009 | Deguchi |
| 2010/0034205 | A1 | 2/2010 | Kusama et al. |
| 2010/0058329 | A1 | 3/2010 | Durazzo et al. |
| 2010/0077063 | A1 | 3/2010 | Amit et al. |
| 2010/0128640 | A1 | 5/2010 | Okamoto |
| 2010/0165985 | A1 | 7/2010 | Sharma et al. |
| 2010/0278040 | A1 | 11/2010 | He et al. |
| 2011/0023090 | A1 | 1/2011 | Asati et al. |
| 2011/0045818 | A1 | 2/2011 | Banks et al. |
| 2011/0054644 | A1 | 3/2011 | Baek et al. |
| 2011/0292940 | A1 | 12/2011 | Okamoto |
| 2011/0305136 | A1 | 12/2011 | Pan et al. |
| 2011/0317696 | A1* | 12/2011 | Aldrin ............... H04L 12/1881 370/390 |
| 2012/0078994 | A1* | 3/2012 | Jackowski ............ H04L 47/19 709/202 |
| 2012/0082048 | A1 | 4/2012 | Taft et al. |
| 2012/0281540 | A1 | 11/2012 | Khan et al. |
| 2013/0163594 | A1 | 6/2013 | Sharma et al. |
| 2013/0232193 | A1 | 9/2013 | Ali et al. |
| 2013/0272305 | A1 | 10/2013 | Lefebvre et al. |
| 2013/0329546 | A1 | 12/2013 | Wijnands |
| 2014/0029414 | A1 | 1/2014 | Jain et al. |
| 2014/0050223 | A1 | 2/2014 | Foo et al. |
| 2014/0064062 | A1 | 3/2014 | Taillon et al. |
| 2014/0105031 | A1 | 4/2014 | McDysan et al. |
| 2014/0105031 | A1 | 4/2014 | McDysan |
| 2014/0215560 | A1 | 7/2014 | Roberson |
| 2014/0304399 | A1* | 10/2014 | Chaudhary ......... H04L 41/5009 709/224 |
| 2014/0307744 | A1 | 10/2014 | Dunbar et al. |
| 2014/0334488 | A1 | 11/2014 | Guichard et al. |
| 2014/0341029 | A1 | 11/2014 | Allan et al. |
| 2014/0362682 | A1 | 12/2014 | Guichard et al. |

OTHER PUBLICATIONS

Joseph, et al., "A Policy-aware Switching Layer for Data Centers," SIGCOMM'08, Aug. 17-22, 2008, Seattle, Washington, USA, pp. 51-62.

Paul, et al., "OpenADN: Mobile Apps on Global Clouds Using OpenFlow and Software Defined Networking," GC'12 Workshop: First International workshop on Management and Security technologies for Cloud Computing 2012, Dec. 2012, 5 pages.

Gurbani, et al., "Session Initiation Protocol (SIP) Overload Control," Internet Engineering Task Force (IETF), SOC Working Group, Internet-Draft, Intended status: Standards Track, May 23, 2013, 35 pages.

Rosenberg, et al., "SIP: Session Initiation Protocol," Internet Engineering Task Force (IETF), Network Working Group, Standards Track, Request for Comments: 3261, Jun. 2002, 269 pages.

Hilt, et al., "Design Considerations for Session Initiation Protocol (SIP) Overload Control," Internet Engineering Task Force (IETF), Informational, Request for Comments: 6357, Aug. 2011, 25 pages.

Cisco, "Cisco Nexus 1000V Series Switches: Deploy Cisco vPath Service-Chaining Architecture," White Paper, retrieved from http://www.cisco.com/c/en/us/products/collateral/switches/nexus-1000v-switch-vmware-vsphere/white_paper_c11-713736.html, on Sep. 16, 2014, pp. 1-4.

International Search Report and Written Opinion in corresponding International Application No. PCT/US2014/038687, dated Sep. 28, 2015, 18 pages.

International Preliminary Report on Patentability in counterpart International Application No. PCT/US2014/038687, dated Dec. 8, 2015, 13 pages.

Written Opinion for International Application No. PCT/US2014/059011, dated Jan. 29, 2015, 5 pages.

International Search Report for International Application No. PCT/US2014/059011, dated Jan. 29, 2015, 4 pages.

Written Opinion for International Application No. PCT/US2014/036789, dated Aug. 21, 2014, 8 pages.

International Search Report for International Application No. PCT/US2014/036789, dated Aug. 21, 2014, 5 pages.

Written Opinion for International Application No. PCT/US2014/036907, dated Nov. 10, 2014, 6 pages.

(56) References Cited

OTHER PUBLICATIONS

International Search Report for International Application No. PCT/US2014/036907, dated Nov. 10, 2014, 3 pages.
P. Quinn, et al., "Network Service Header" draft-quinn-sfc-nsh-03.txt, Network Working Group, Internet-Draft, Jul. 3, 2014, 27 pages.
L. Fang, et al., "BGP IP VVPN Virtual PE", draft-fang-l3vpn-virtual-pe-02, Internet-Draft, Apr. 7, 2013, 25 pages.
R. Fernando, et al., "Virtual Topologies for Service Chaining in BGP IP VPNs", draft-rfernando-l3vpn-service-chaining-01, Internet-Draft, Feb. 25, 2013, 16 pages.

* cited by examiner

US 9,806,962 B2

DETERMINING THE OPERATIONS PERFORMED ALONG A SERVICE PATH/SERVICE CHAIN

CROSS-REFERENCE TO RELATED APPLICATION

This application is a continuation of U.S. application Ser. No. 13/912,224, filed Jun. 7, 2014, the entirety of which is incorporated herein by reference.

TECHNICAL FIELD

The present disclosure relates to networking for service chains/service paths.

BACKGROUND

Network services are widely deployed and essential in many networks. The services provide a range of functions such as security, wide area network (WAN) acceleration, firewall services, and server load balancing. Service functions that form part of the overall service may be physically located at different points in the network infrastructure, such as the wide area network, data center, campus, and so forth.

Current network service deployment models are relatively static, and bound to topology for insertion and policy selection. Furthermore, they do not adapt well to elastic service environments enabled by virtualization.

New data center network and cloud architectures require more flexible network service deployment models. Additionally, the transition to virtual platforms requires an agile service insertion model that supports elastic service delivery. The movement of service functions and application workloads in the network and the ability to easily bind service policy to granular information such as per-subscriber state are particularly useful.

DESCRIPTION OF EXAMPLE EMBODIMENTS

Overview

Figure 1:
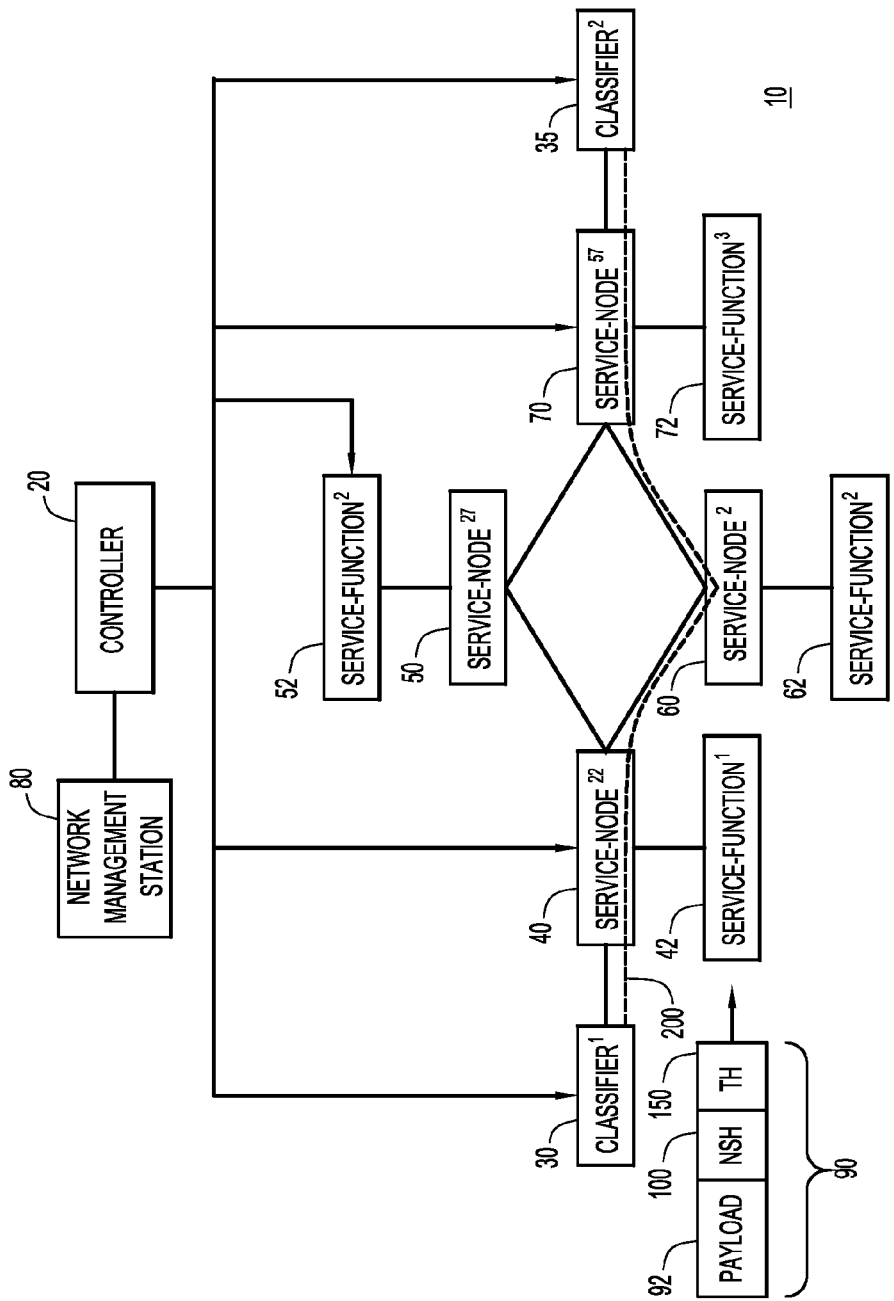
FIG. 1 is a block diagram of an example arrangement of service nodes in a network and a service path is created to apply service functions or applications to traffic.

Presented herein are techniques performed in a network comprising a plurality of network nodes each configured to apply one or more service functions to traffic that passes the respective network nodes in a service path. At a network node, an indication is received of a failure or degradation of one or more service functions or applications applied to traffic at the network node. Data descriptive of the failure or degradation is generated. A previous service hop network node at which a service function or application was applied to traffic in the service path is determined. The data descriptive of the failure or degradation is communicated to the previous service hop network node.

Example Embodiments

A service chain is defined as a set of service functions, e.g., firewall, network address translation (NAT), deep packet inspection (DPI), intrusion detection service (IDS), and the order in which they should be applied to selective packets as they are forwarded through a service-path. This form of service chaining, while useful, does not provide enough functionality for the delivery of more complex services that rely upon the binding of service policy to granular information such as per-subscriber state, or receipt of metadata specifically formatted for consumption by a particular service function. Examples of metadata specifically formatted for consumption by a service function include application identification, network forwarding context, flow identifier and user identity. Such advanced services require that service context and metadata be carried within service headers as part of the data-plane encapsulation.

Service chain construction involves establishment of a binding between forwarding state and the service chain. This mapping of forwarding-state to the service chain defines the service path and is most typically formed using a network overlay. Service nodes perform operations and service functions on packets that are forwarded through the service path.

While the control and data-plane elements of a service path are well understood, it is not currently possible to determine which service hop was the last successful one to have been applied should failures such as black holing, dropping, or incorrect forwarding of packets occur along the service path. This creates an operational/security problem, as packets may not reach the expected service nodes as defined by the appropriate service policies or worse still have service functions misapplied to them. These two issues are critical problems to solve: the operational/security implications such as the wrong firewall policy being applied to the traffic threaten the robustness of the solution.

All of these issues result in the same observed behavior. Operators/customers do not see the end-to-end packet flow as traffic passes through each service hop along the service path. The goal therefore is to identify which is the root cause and at which service hop/service node.

There is a need for a solution that is able to detect failures and/or function degradation at the application and/or service function layer so that preventative measures may be taken to bypass the failure. In addition, such a solution should either provide the methods necessary for communication of said failures using the data plane to upstream service nodes/load balancers, and/or send notifications and details of the failure type to an off-board Operations and Management (OAM) manager, or service controller/orchestration system.

According to one aspect of the techniques presented herein, a method is provided to (i) detect failures and/or function degradation at the application and/or service function layers, (ii) communicate details of the failure type through the advertisement of metadata in the data plane, and/or communicate details of the failure type through the advertisement of metadata to an off-board OAM manager or service controller/orchestration system, and (iii) provide application and/or service function failure bypass through manipulation of the service node/load balancer Equal Cost Multiple Path (ECMP) process. ECMP is a routing strategy in which next-hop packet forwarding to a single destination can occur over multiple "best paths" which tie for top place in routing metric calculations.

According to another aspect of the techniques presented herein, a network operator may activate a troubleshooting function upon detection of such failures along a service path, to allow for debugging/troubleshooting data to be sent to an off-board OAM manager so that the network operator may take corrective action having discovered the last successfully applied service hop of the service path/service chain.

Verification of the integrity and forwarding state of a service path is a fundamental requirement for any network operator. Currently, this verification process may be performed in one of two ways; (i) using real user traffic, and (ii) using OAM packets that may be forwarded to an on-board OAM function at a service node to verify operation and status of a given service function. However, both of these methods present challenges that do not fully satisfy all verification requirements.

Using real user traffic for verification of a service path has the implication that a user traffic flow is effectively "hijacked" for OAM purposes; this is not only undesirable but presents issues with regards to billing and service level agreement management. Using OAM packets punted to an on-board OAM function does not truly verify the service path as such OAM packets are taken from the normal processing path at each service hop and are presented to an OAM processing module for verification.

Thus, according to still another aspect, techniques are presented herein for service path verification that do not rely upon user traffic or an on-board OAM processing module but rather use the functions of Network Service Headers (NSHs) and therefore verifies the same forwarding path as that used for user data sent through the service chain.

In accordance with the techniques presented herein, service nodes utilize information carried within service headers in the data-plane, such as network classification used for deriving targeted service policies and profiles. Service nodes may also determine common metadata related to a particular service such as finer classification that can be passed to the service functions further down the service-path. In other words, services benefit from metadata derived both from the network as well as the service functions that form a given service chain. Metadata can also be passed from network node to network node with a service between network nodes.

The metadata imposed by the network node originating the service chain is a combination of the metadata pushed by a central controller and metadata determined by the network node itself. Controllers push network classification specific metadata to all the network nodes that act as classifiers. These network nodes perform the classification and choose the assigned metadata for that classification along with the forwarding state. The determined metadata could be related to aspects of the service topology such as tenant identity. The implication of associating such metadata to the forwarding state and passing it to the functions that provide services is that more complex services can be delivered, for instance, on a tenant boundary for a given service-path. This can result in simpler services because the services do not need to derive information or re-classify every packet/flow.

Reference is now made to FIG. 1 for a description of an example network environment in which the techniques presented herein may be employed. In the example of FIG. 1, there is a controller 20 that is in communication with classifier network nodes 30 and 35 and with a plurality of service nodes 40, 50, 60 and 70. The service nodes 40, 50, 60 and 70 are also called network nodes herein and the classifier nodes 30 and 35 are also called head-end nodes. The service nodes 40, 50, 60 and 70 host/support respective service functions or applications 42, 52, 62 and 72, each service function having a corresponding service-id. Service node 40 is also denoted service-node$^{22}$, service node 50 is denoted service-node$^{27}$, service node 60 is denoted service-node$^{2}$, and service node 70 is denoted service-node$^{57}$. Service node 40 hosts service-function 42 that is also denoted service-function'. Service node 50 hosts service-function 52 that is also denoted service-function$^{2}$. Service node 60 hosts service-function 62 that is also denoted service-function$^{2}$. Service node 70 hosts service-function 72 that is also denoted service-function'. Some of the service-functions hosted by the service nodes are the same in the example of FIG. 1. Specifically, service node 50 and service node 60 host service-functions 52 and 62, which are the same service-function, service-function$^{2}$. In other words, service-function$^{2}$ appears in multiple instances on different service nodes in the example scenario of FIG. 1.

There is also a network management station 80 that may be coupled to the controller 20 to communicate with the service nodes (or may communicate with the service nodes indirectly) in order to perform various network management functions as described herein.

FIG. 1 also shows an example of a packet 90 that passes through the head-end node 30. The packet 90 includes payload 92 that is encapsulated in a Network Service Header (NSH) 100 and then encapsulated within a transport header (TH) 150. The NSH 100 is metadata added to a packet or frame that is used to create a service plane. The payload 92 and the NSH 100 are then encapsulated in an outer header, the TH 150, for transport. The NSH 100 may be added by a service classification function, i.e., the head-node 30 (in the form of a device or application) that determines which packets require servicing, and correspondingly which service path to follow to apply the appropriate service.

The Network Service Header

Service chaining techniques are enabled through the use of transport independent Network Service Headers (NSH) in the data plane. The NSH 100 comprises a plurality of headers, and as will become apparent, these headers contain service related information and have two main elements:
1. A fixed sized, transport independent per-packet/frame service metadata.
2. Data plane encapsulation that utilizes the network overlay topology to deliver packets to the requisite services.

The NSH 100 is designed to be easy to implement across a range of devices, both physical and virtual, including hardware forwarding elements. The NSH 100 addresses several limitations associated with network service deployment today.

Topological Dependencies: network service deployments are often coupled to the physical network topology creating artificial constraints on delivery. These topologies serve only to "insert" the service function; they are not required from a native packet delivery perspective. For example, firewalls often require an "in" and "out" layer-2 segment and adding a new firewall requires changing the topology i.e. adding new layer-2 segments. This is restrictive because as more services are required—often with strict ordering—topology changes are needed before and after each service resulting in complex network changes and device configuration. In such topologies, all traffic, whether a service needs to be applied or not, will often pass through the same strict order. A common example is web servers using a server load balancer as the default gateway. When the web service responds to non-load balanced traffic (e.g. administrative or backup operations), all traffic from the server must traverse the load balancer forcing network administrators to create complex routing schemes or create additional interfaces to provide an alternate topology.

Service Chaining: service functions are most typically independent, e.g. service-function-1 and service-function-2 are unrelated and there is no notion at the service layer that service-function-1 occurs before service-function-2. However, to an administrator many service functions have a strict ordering that must be in place yet there is no consistent way to impose and verify the deployed service ordering.

Service Policy Application: service functions rely on either topology information such as virtual local area networks (VLANs) or packet (re)classification to determine service policy selection, the service action taken. Topology information is increasingly less viable due to scaling, tenancy, and complexity reasons. Per-service function packet classification is inefficient and prone to errors, duplicating functionality across services. Furthermore, packet classification is often too coarse lacking the ability to determine class of traffic with enough detail.

Elastic Service Delivery: given the current state of the art for adding/removing services largely centers around VLANs and routing changes, rapid changes to the service layer can be difficult to realize due to the risk and complexity of such changes.

Common Header Format: various proprietary methods are used to share metadata and create service paths. An open header provides a common format for all network and service devices.

Transport Agnostic: services can and will be deployed in networks with a range of transports, including underlays and overlays. The coupling of services to topology requires services to support many transports or for a transport gateway function to be present.

FIG. 1 shows at reference numeral 200 a primary service path for a service chain between Classifier[1] and Classifier[2]. At this time, as shown in FIG. 1, the service path is in "steady state" meaning it is operating normally and traffic is being forwarded and processed by service functions normally.

There are three operational phases that work in tandem to detect and bypass an application/service function failure/degradation:
1. Application/service function layer failure detection; and
2. Advertisement of application/service function failure type through the use of metadata; and
3. Automatic traffic bypass of the service node hosting the failed application/service function.

Application/Service Function Layer Failure/Degradation Detection

There are many reasons why an application/service function might fail and it is not always possible to detect such failures at the transport layer, as the underlying packet forwarding through the overlay network may be fully operational. Furthermore, complete application/service function failure is only one of the possible failure types; others include functional degradation, performance degradation above and beyond a specified threshold, unrelated failure of the network element hosting the application/service function, etc.

Figure 2:
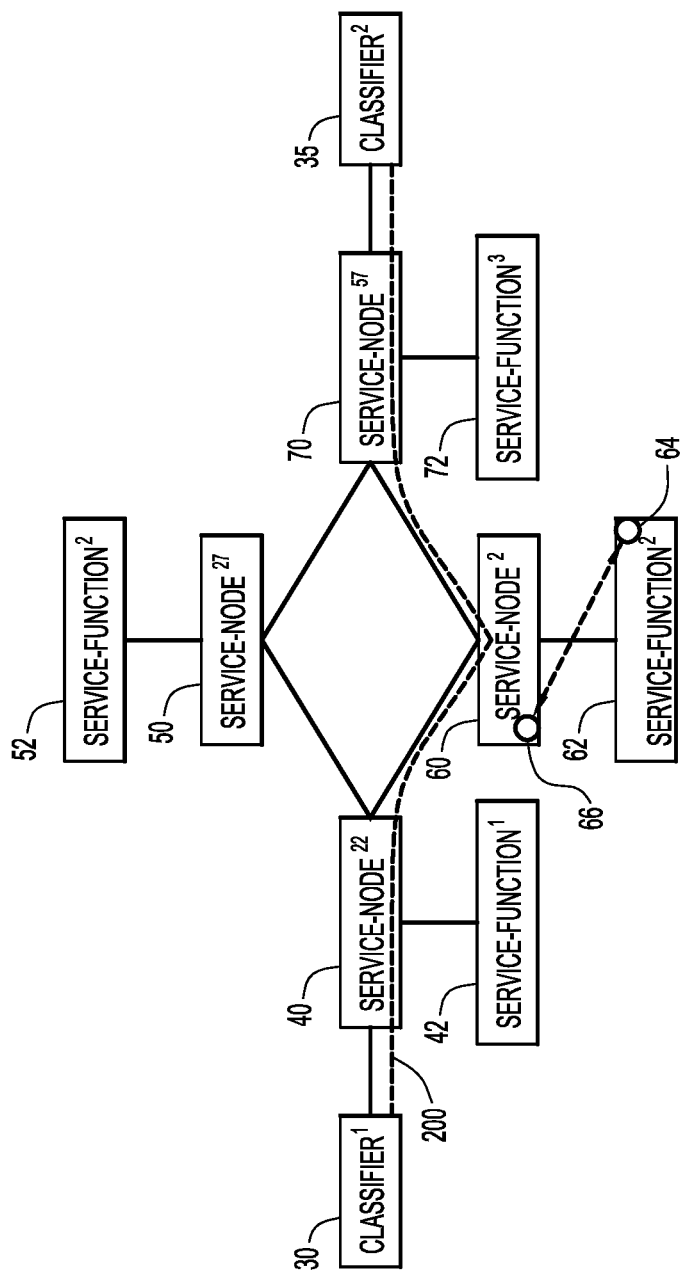
FIG. 2 is a block diagram similar to FIG. 1, but showing monitoring for degradation or failure of a service function at a service node.
Figure 3:
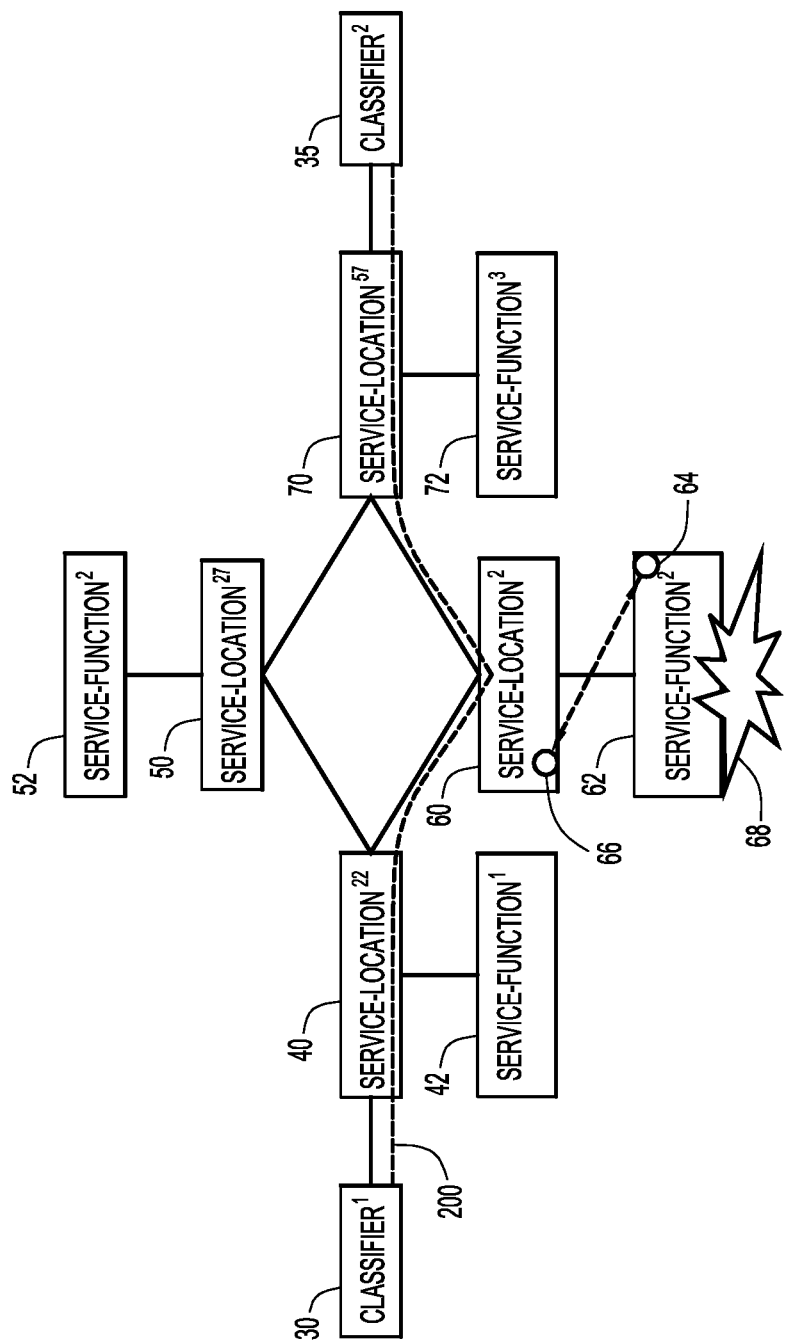
FIG. 3 is a block diagram similar to FIG. 2, but showing detection of degradation or failure of a service function at a service node.

Reference is now made to FIGS. 2 and 3. In or associated with service function 62 there is a monitoring process 64 deployed to detect failures or degradation of service within the service function 62. At 66, there is an OAM manager function located at the service node 60 deployed to receive a failure or degradation indication from the service function monitoring process 64.

FIG. 3 shows a failure or degradation of service 68 detected at the service function 62 and communicated by the monitoring process 64 to the OAM manager 66 of the service node 60 that is hosting the application/service function 62. Upon notification of the failure, the OAM manager 66 correlates any associated failure/degradation information and proceeds to the next step of communicating the failure to other network elements such as upstream service nodes/load balancers, off-board OAM managers, and/or centralized service controllers/orchestration systems. A degradation may involve a drop in the level of performance of a service function such as processing throughput within a specified range, packet drops above a certain threshold or availability of necessary internal resources to successfully process all packets sent through the service function. By contrast, a failure is a complete or total failure in the ability of a service function to perform as it is designed to perform.

Advertisement of Application/Service Function Failure Type Through the Use of Metadata Once an application/service function failure or degradation has been detected and reported to the OAM manager of the hosting service node, it is necessary that other network elements be informed so that corrective action may be taken to bypass the failure. This may be achieved in a distributed or centralized fashion by communicating the failure through the data plane (as opposed to using a signaling protocol for this purpose such as is done today for transport link/node failures) to upstream network elements (distributed), or by advertising the failure to an off-board OAM manager or centralized service orchestration controller (centralized).

Accordingly, the service node hosting the failed or degraded service function generates metadata to include details of the application/service function failure and to be communicated either within the data plane to interested upstream network elements, or through whatever northbound protocol is appropriate for communication with a centralized service orchestration system generally represented by the controller 20 shown in FIG. 1.

Figure 4:
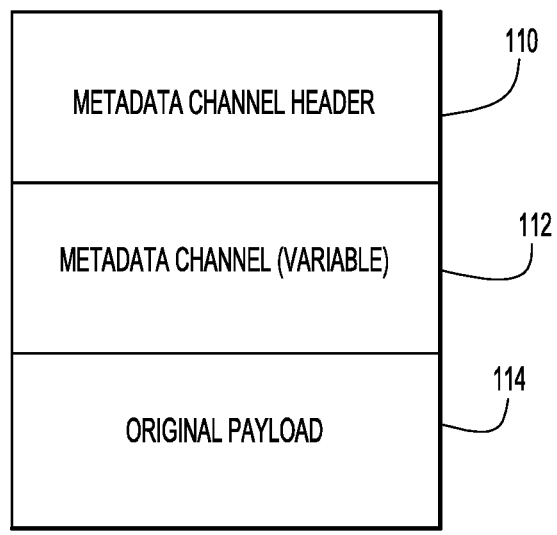
FIG. 4 is a diagram of a Metadata Channel Header used to carrying information indicating detection of a failure or degradation of a service function at a service node.

To communicate application/service function failure metadata, in accordance with one example, a common header is defined to be used for carrying metadata in a NSH 100 for Internet Protocol (IPv4), IPv6, and Multiprotocol Label Switching (MPLS) packets as shown in FIG. 4.

The Metadata Channel Header 110 provides for a "Metadata Channel Type" (MCT) that specifies the type of metadata carried within the packet. For the purposes of these techniques, a new MCT is defined called "Application/Service Function Failure" with a value equal to be determined. Details of the application/service function failure are carried within the Metadata Channel 112 that follows the Metadata Channel Header 110. The original payload of the packet is shown at 114 and is the original packet that was sent into the network. In this case, it would be blank or empty as the packet is generated by the service node that detects the service function failure.

As an alternative to the Common Metadata Header it is also possible to carry the application/service function failure information within the NSH (through definition of an opaque context header defined for that purpose). In order for a service node (that is hosting a failed or degraded service function) to know which particular upstream network elements to advertise the metadata to, the NSH 100 referred to above in connection with FIG. 1 may be used to (i) identify the local service function that should have been applied to the packet, and (ii) extract the previous service hop information from the service-path mapping associated with that NSH.

Figure 5:
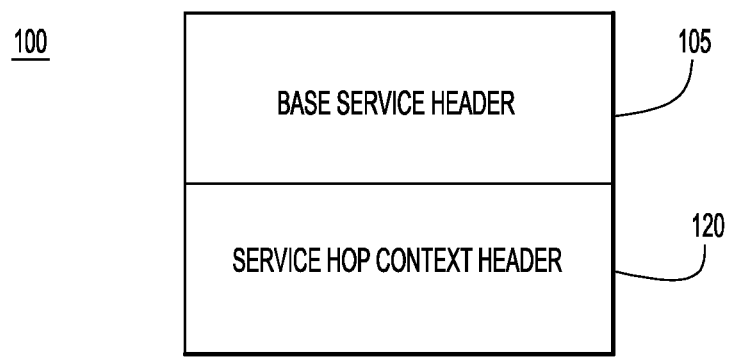
FIG. 5 is a diagram of a service header that includes a base service header and a service hop context header configured to carry information indicating detection of a failure or degradation of a service function at a service node.
Figure 6:
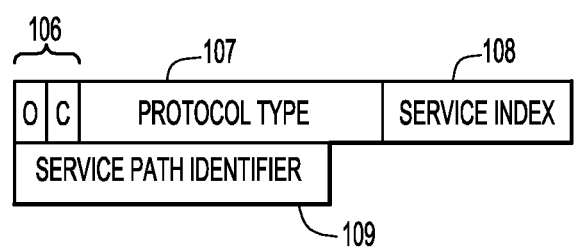
FIG. 6 is a more detailed diagram showing an example of the base service header.
Figure 7:
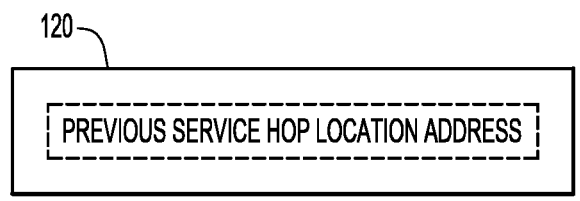
FIG. 7 is a diagram showing an example of the service hop context header.

The NSH 100 may be constructed as shown in FIGS. 5-7. FIG. 5 shows that the NSH 100 comprises a base service header 105 and an opaque service hop context header 120 that is carried as part of the NSH 100 to indicate the location information of the previous service hop and is used by the service node to identify which of the service functions within the service chain it should have applied and which of the service functions was applied at the previous service hop.

One form of the base service header 105 is shown in more detail in FIG. 6. The base header 105 may be composed of two words, but for simplicity it is shown as a single element in FIG. 2. The base header 105 provides information about the NSH 100 and service path identification. The base header 105 includes a field 106 that contains certain flags described below, a protocol type field 107, a service index field 108 and a service path identifier field 109. The field 106 includes an "O" bit and a "C" bit. The "O" bit is a one-bit flag that indicates whether a packet is an OAM packet. Participating nodes examine the payload and take appropriate action (i.e. return status information) when the "O" bit is set. The "C" bit indicates whether context headers are present. When the "C" bit is set, one or more contexts are in use (i.e. a value placed in a context is significant). The "C" bit specifies that the ordering and sizing of the contexts is predetermined, e.g., as shown in FIG. 4 described hereinafter. A "C" bit equal to zero indicates that no contexts are in use and that they can be ignored. If a context header is not in use, the value of that context header is zero.

The protocol type field 107 indicates the protocol type of the original packet or frame. The service index field 108 specifies time-to-live (TTL) functionality and location within the service path. The service index is decremented by service nodes after performing required service function(s).

The service path identifier field 109 identifies a particular service path. A participating node uses this identifier for path selection.

FIG. 7 shows an example of the service hop context header 120. In one example, the service hop context header 120 may specify the address of a previous service hop location. The contents of the header 120 is popped and pushed at each service hop along the service chain. An equivalent IPv6 context header may also be defined.

The combination of the service path identifier and service index carried within the NSH is used for identification of which specific service functions should be applied to packets. Each service path identifier is a unique value that points to an ordered list of service functions (e.g., service-function-1, service-function-2, service-function-3) and the service index is decremented by 1 at each service hop so that a Service Node receiving a packet prefaced with a NSH is able to identify which of the ordered list of service functions it should apply.

Using this mechanism combined with the service hop context header 120, the OAM manager function at the service node that is hosting the failed application/service function is able to identify the previously applied service function and service hop and therefore send its metadata to that specific network node.

Traffic Bypass of the Service Node Hosting the Failed Application/Service Function Traffic bypass of the service node hosting a failed application/service function is triggered through the receipt of the "Application/Service Function Failure" metadata (or NSH context header in lieu of the metadata MCT) at the previous service hop network element, or through instruction from an orchestration system.

In current networking systems, load balancers use schemes to detect failures and take them out of their predictors. There are two key differences; (i) load balancers use signaling to achieve this rather than an explicit data plane trigger, and (ii) load balancers detect failures in the forwarding path (link/node failure) as opposed to failures at the application and/or service function layers.

By contrast, the techniques presented herein trigger traffic bypass through receipt of failure information within the data plane. Receipt of the failure information forces a service node/load balancer to remove the failing elements from their predictors (or mark the next-hop as inoperative within their ECMP function) and select a different service hop from the updated set of available next-hops.

Figure 8:
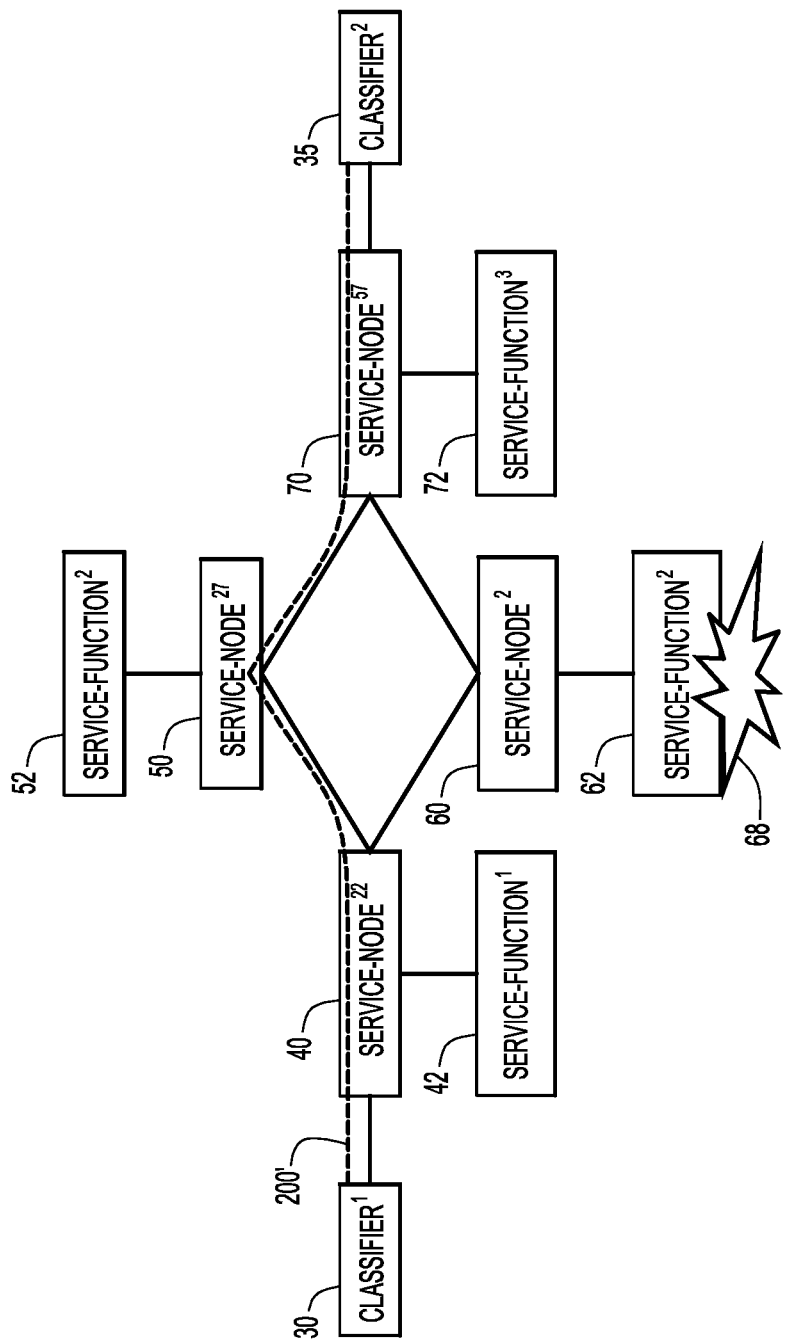
FIG. 8 is a diagram similar to FIG. 3, but showing bypass or re-routing a service path around a service function experiencing degradation or failure.

FIG. 8 shows an example of the bypass operation for the scenario described above in connection with FIGS. 2 and 3. After the failure 68 of service function 62, the primary service path 200 is re-routed to bypass service function 62 (service-function$^2$) and instead pass through service node 50 that also hosts service-function$^2$, the same service function that was being hosted at service node 60 but which suffered a failure or degradation at service node 60. The re-routed primary service path is thus indicated by reference numeral 200' (200 prime).

Figure 9:
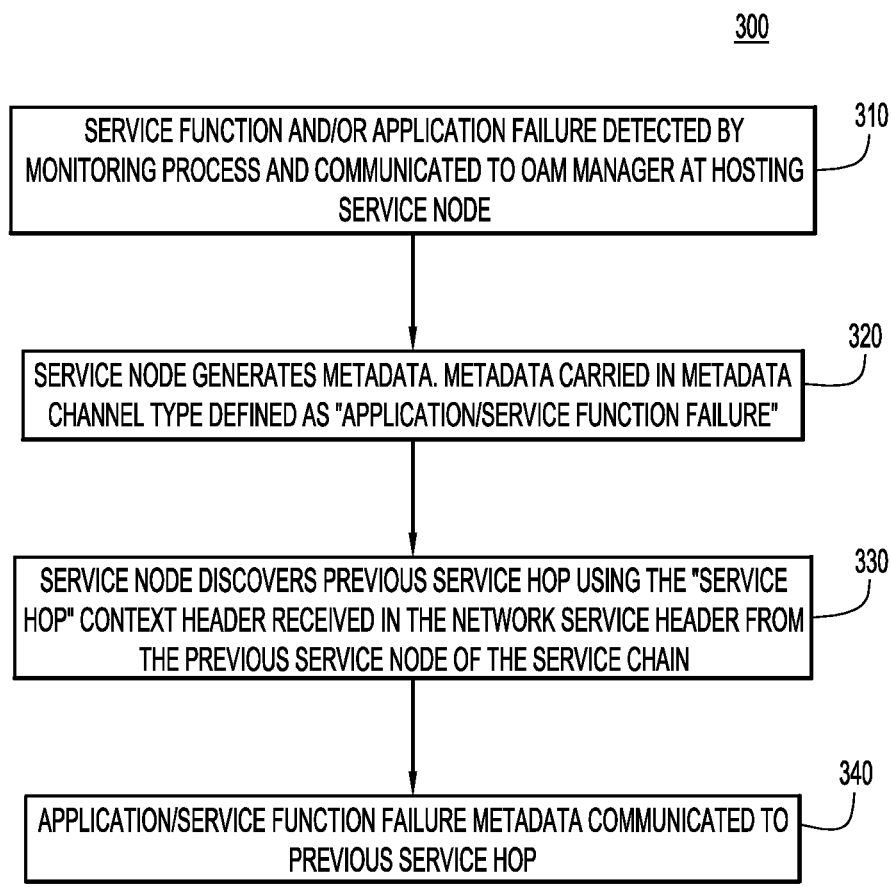
FIG. 9 is a flow chart of operations performed at a service node that is hosting a service function or application experiencing a failure or degradation.

Turning to FIG. 9, a flow chart is shown that depicts a process 300 for application/service function failure or degradation detection. At 310, a service function and/or application failure is detected by a monitoring process and communicated to an OAM manager at the hosting service node. At 320, the service node generates metadata that is carried in a Metadata Channel Type defined as "Application/Service Function Failure". At 330, the service node discovers the previous service hop using the service hop context header received in the NSH from the previous service node of the service chain. At 340, the application/service function failure metadata is communicated to the previous service hop.

Figure 10:
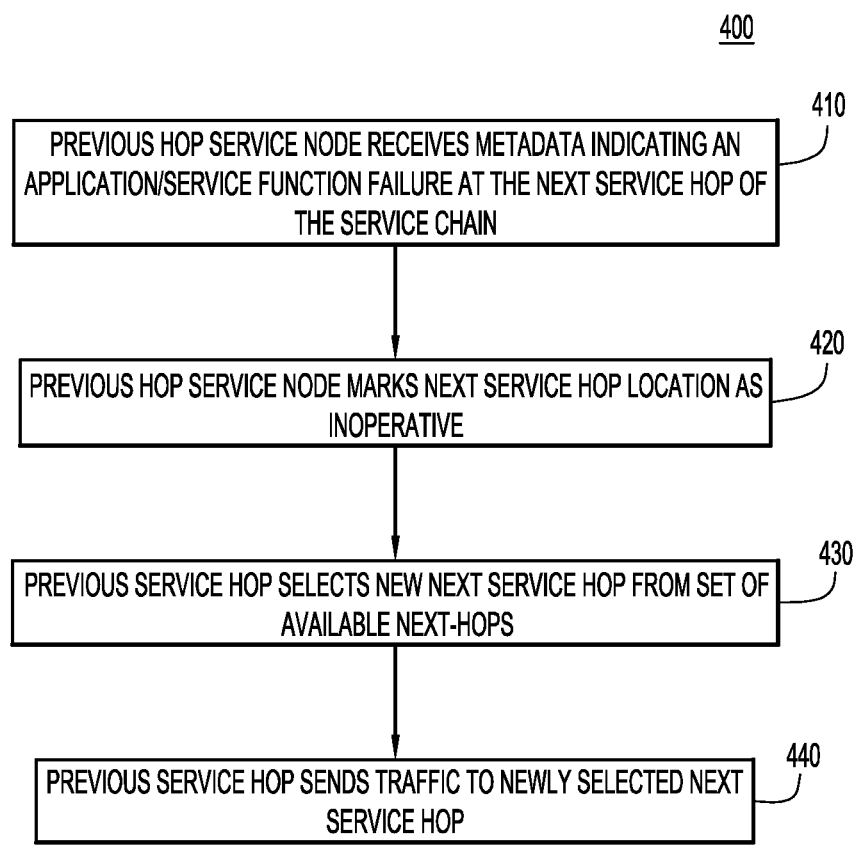
FIG. 10 is a flow chart of operations performed at a service node that receives information indicating that the service function at the next hop is experiencing a failure and thus traffic should bypass that service node.

FIG. 10 shows a flow chart depicting a traffic bypass process 400 performed at the previous hop service node. At 410, the previous hop service node receives metadata indicating an application/service function failure at the next service hop of the service chain. At 420, the previous hop service node marks the next hop service node location as inoperative. At 430, the previous hop service node selects a new next service hop from set of available next-hops that serve the same service function or application as the failed or degraded one, if available, or otherwise selects the next service node as appropriate. At 440, the previous service hop sends traffic to the newly selected next service hop.

In summary of the concepts presented above in connection with FIGS. 1-10, techniques are provided to (i) detect failures and/or function degradation at the application and/or service function layers, (ii) communicate details of the failure type through the advertisement of metadata in the data plane, and/or communicate details of the failure type through the advertisement of metadata to an off-board OAM manager or service controller/orchestration system, and (iii) provide application and/or service function failure bypass through manipulation of the service node/load balancer ECMP process.

There are numerous advantages associated with these techniques. They provide the capability to generate "application/service function failure" metadata or NSH opaque context headers, from an OAM manager function at a service node upon detection of failure or degradation of functionality. This enables identification of the previous service hop of a service chain and advertisement of the generated metadata to the previous service hop network element so as to trigger automatic traffic bypass of the failing or degraded service node. In addition, a service node/load balancer can trigger traffic bypass by manipulation of their ECMP decision process through correlation of the "application/service function failure" metadata or NSH opaque context headers, and available service node next-hops for the required service function. Further still, these techniques allow for the correlation of "application/service function failure" metadata or opaque NSH context headers at an off-board OAM manager and/or centralized controller/orchestration system.

Figure 11:
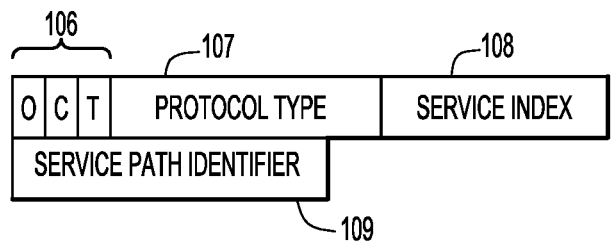
FIG. 11 is a diagram of another form of the base service header configured to include information indicating that a service node that receives the packet is to generate debugging and/or troubleshooting information for a service function or application applied at that service node.

Reference is now made to FIG. 11. FIG. 11 illustrates a technique that exploits the base service header of the NSH to allow a network operator to initiate a debugging/troubleshooting operation to have debugging data sent to an off-board OAM manager. This allows a network operator to take corrective action having discovered the last successfully applied service hop of the service path/service chain. A network operator would activate this operation upon detection of such failures along a service path.

The base service header 105 (as depicted in FIG. 6) defines an OAM (O) bit that indicates that the packet is an operations and management packet rather than user data. Receipt of such a packet at a service node forces the processing to be punted to an on-board OAM function therefore bypassing normal packet processing. This behavior may be undesirable for the purposes of debugging/troubleshooting, as the full end-to-end service path, as well as each service hop, needs to be exercised, and data collected at each service hop, to be able to determine the source of the failure.

The (T) bit shown in FIG. 11 provides another way to gather debugging and troubleshooting information about the packet and applied service functions at each service hop without altering the processing of the packet itself, having discovered the last successfully applied service hop of the service chain. The setting of the Tap (T) bit within the base service header provides an indication to a receiving service node that the service node should execute check pointing and/or collection of the packet payload and send debugging and/or troubleshooting information to an off-board OAM manager. This allows for the generation of debugging/troubleshooting data at each service hop along a given service path and continue normal packet processing without punting of the packet to an on-board OAM function.

Normal processing of the packet through the service path continues so that each service node along the service path is forced to generate debugging/troubleshooting information that can be correlated at an off-board OAM manager so that corrective action may be taken by the network operator or orchestration system having discovered the last successfully applied service hop of the service chain. An example of an off-board OAM manager is the network management station 80 shown in FIG. 1.

Figure 12:
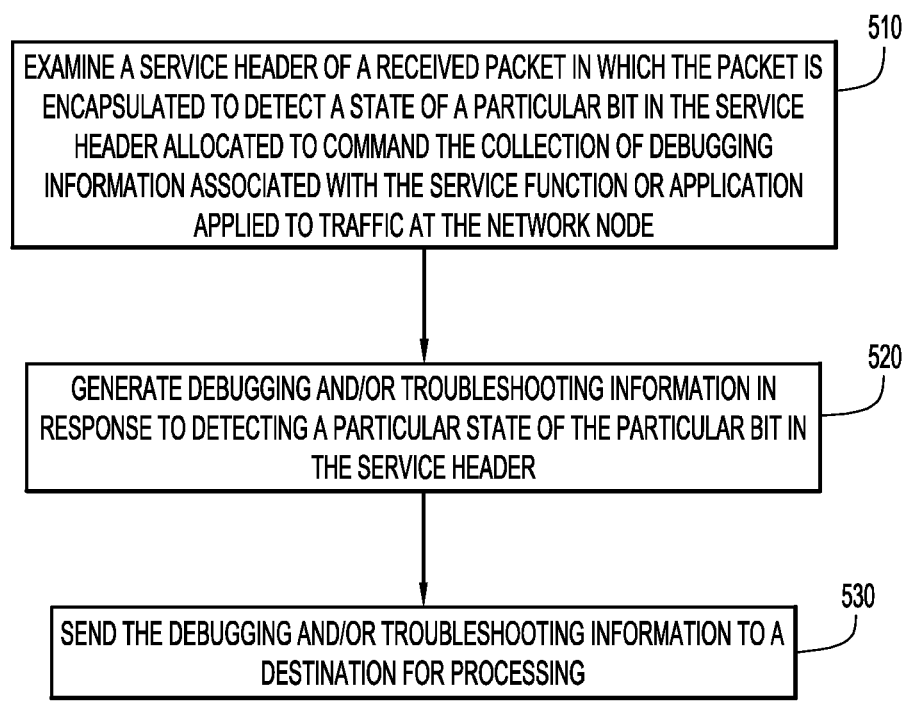
FIG. 12 is a flow chart depicting operations performed at a service node that receives a packet encapsulated with a base service header as depicted in FIG. 11.

FIG. 12 illustrates a flow chart for a process 500 that exploits the use of the T bit described above in connection with FIG. 11. At 510, at a network node that receives a packet, the network node examines a service header (e.g., NSH) of the received packet in which the packet is encapsulated to detect a state of a particular bit (e.g., T bit) in the service header allocated to command the collection of debugging information associated with the service function or application applied to traffic at the network node. At 520, the network node generates debugging and/or troubleshooting information in response to detecting a particular state of the particular bit in the service header. At 530, the network node sends the debugging and/or troubleshooting information to a destination for processing. The generation of the debugging and/or troubleshooting information is performed without altering normal processing of traffic passing through the network node. The destination device or software process (off-board OAM manager) determines/identifies the last service function to have been successfully executed along a (failing service path) through generation of check pointing and/or collection of packet payload, to an off-board (centralized) OAM manager. Again, the techniques depicted by FIGS. 11 and 12 enable the collection of forensics information, to identify individual service hops on a service path that may be underdoing problems, without an OAM punt to a local OAM manager at each service node.

Figure 13:
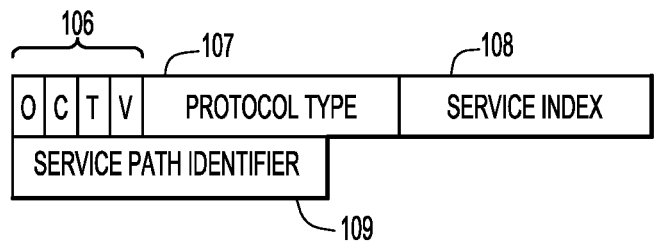
FIG. 13 is a diagram of still another form of the base service header configured to include information indicating that the packet is a synthetic packet and should be forwarded as normal traffic for the service path to allow for forwarding verification of the service path.

Turning to FIG. 13, a diagram is shown that is similar to that of FIG. 11, but which includes a still further bit, called a V bit in the field 106 of the base service header 105. The V bit, when set, indicates that the packet is a synthetic packet injected into the service path for verification of packet forwarding through the service chain. The V bit is set independently of the O bit thereby maintaining the ability to use normal OAM processing with network service headers if required. Receipt of a packet (with the V bit set) by the last service node within the service path indicates that the packet should not be forwarded after the last service function has been applied, but rather be dropped and an off-board OAM manager informed of the action.

Synthetic user data is injected at the entry point into a service path, e.g., by a classifier (head-end node) in response to a command received from a controller 20 or network management station 80 (FIG. 1), and is carried through the service path from ingress to egress with processing of the packet at each service hop. Such traffic is forwarded through the same service path/service chain as user data but is intercepted at the exit point of the service path and not forwarded after the last service function has been applied. In this way a service path may be verified as operational from the data forwarding perspective.

Synthetic packets may be used in two modes:
1. On-demand: a user-triggered event starts the transmission of the synthetic packet.
2. Periodic: periodically a user packet is copied at the ingress to a service path and that packet copy is marked with the V bit and injected into the service path.

Additionally, two modes for verification of the service path may be defined:
1. Path Connectivity Check: use of the V bit as described above.
2. Detailed Path Service Verification: use of the V bit in combination with the T bit described above.

The intelligence to decide when to inject a synthetic packet may reside in the controller 20 shown in FIG. 1, or in the network management station 80 also shown in FIG. 1.

Figure 14:
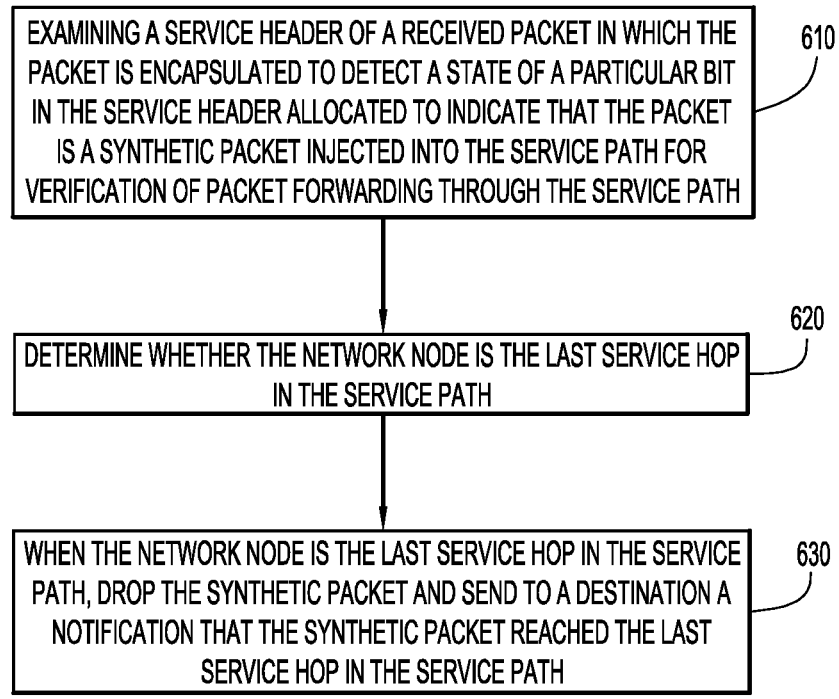
FIG. 14 is a flow chart depicting operations performed at a service node that receives a packet encapsulated with a base service header as depicted in FIG. 13.

FIG. 14 is a flow chart for a process 600 performed at a service node for handling of a synthetic packet. At 610, the service node examines a service header of a received packet in which the packet is encapsulated to detect a state of a particular bit in the service header allocated to indicate that the packet is a synthetic packet injected into the service path for verification of packet forwarding through the service path. At 620, the service node determines whether it is the last service hop in the service path. This can be achieved by examining the service index in the base server header. At 630, when the service node determines that it is the last service hop in the service path, it drops the synthetic packet and sends a notification to a destination that the synthetic packet reached the last service hop in the service path. The destination may be the controller 20 and/or network management station 80 shown in FIG. 1, and the receipt of this notification indicates that traffic has reached that last service hop in the service path, allowing for a determination of whether traffic is being properly forwarded in the service path by the service nodes. As explained above, synthetic packets may be injected into the service path on an on-demand or periodic basis.

Thus, the techniques depicted in FIGS. 13 and 14 provide for a method for verification of a service path that does not rely upon user traffic or on-board OAM processing logic but rather uses the functions of service headers in the data plane, and therefore verifies the same forwarding path as that used for user data through the service chain. Context verification can be made for any packet, any tenant, and any service. Finally, these techniques can be used as a "Service Trace Route" function e.g., it can be activated on every 'n'th user packet to keep track of the health of the service path. There is total flexibility in the crafting of synthetic user packets and all service headers, with complete control over what functionality along a service path is tested. These techniques allow for testing of the end-to-end "service connectivity", but also to verify service program, context, and service functions. Synthetic service information is created, injected for context, path, and service verification for any tenant, any packet, and any service, in a way that fate shares with user data but does not impact end-users. This service verification is indistinguishable from user data but does not get exposed to a customer. It achieves verification of a service path without relying upon punted OAM processing hop-by-hop through the service path.

Figure 15:
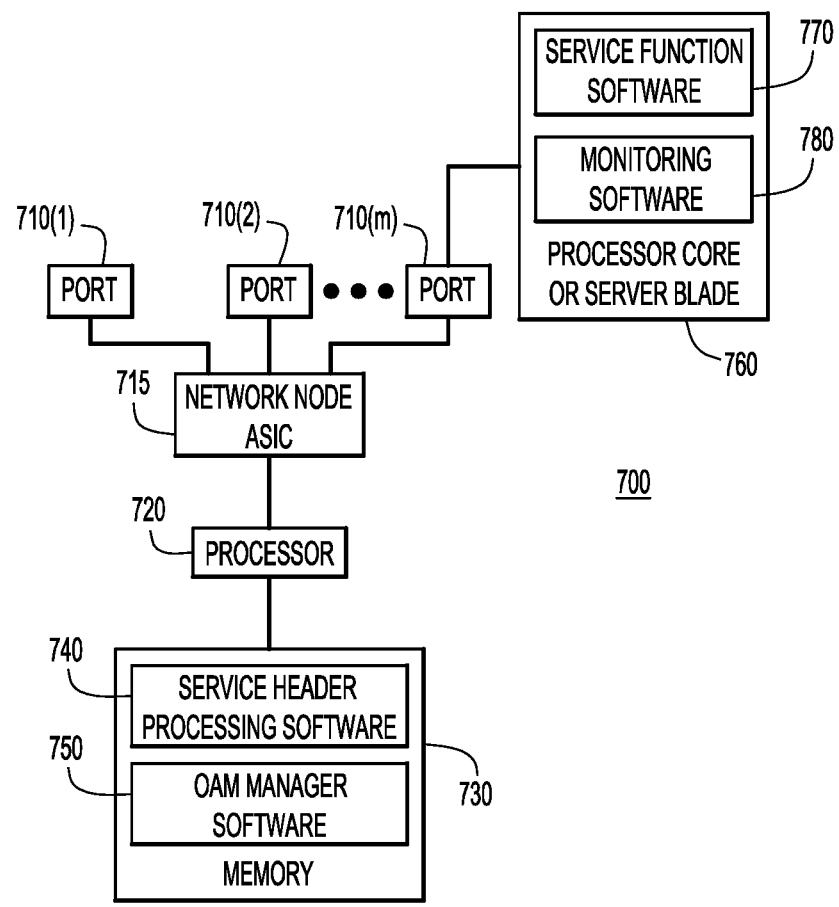
FIG. 15 is an example of a block diagram of a network node configured to perform the techniques presented herein.

FIG. 15 illustrates an example block diagram for a network/service node, e.g., a switch, router, gateway, etc., configured to perform the operations described herein for a network node. It should be understood that a virtual network node would be a software-emulated or virtualized version of what is shown in FIG. 15. The network node 700 comprises a plurality of ports 710(1)-710(m), a network Application Specific Integrated Circuit (ASIC) 715, a processor or central processing unit (CPU) 720 and memory 730. The ports 710(1)-710(m) receive ingress packets and output egress packets from the network node. The network node ASIC 720 directs incoming packets to ports for egress according to logic as well as controls from the processor 720. For example, if the network node is a router, then the ASIC 715 is a router ASIC configured for network routing functions, and if the network node is a switch, then the ASIC 715 is a switch ASIC configured for network switch functions. The processor 720 is a microprocessor or microcontroller, for example, and executes instructions for the service header processing firmware/software 740 stored in memory 730. The service header processing firmware/software 740 and OAM manager software 750 include instructions that, when executed by the processor 720, cause the processor to perform the operations described herein in connection with FIGS. 1-14 for a network node/service node.

The operations of a service function or application associated with network node 700 are implemented by service function or application software 770 running on a processor core or server blade 760 that is in communication with a port, e.g., port 710(m), of the network node. In addition, there is monitoring software 780 running on the processor core or server blade 760 to perform monitoring of the service function in order to detect when a degradation or failure occurs in the associated service function or application at the network node. The monitoring software 780 performs the aforementioned monitoring process shown at reference numeral 64 in FIGS. 2 and 3.

The memory 730 may comprise read only memory (ROM), random access memory (RAM), magnetic disk storage media devices, optical storage media devices, flash memory devices, electrical, optical, or other physical/tangible memory storage devices. In general, the memory 730 may comprise one or more tangible (non-transitory) computer readable storage media (e.g., a memory device) encoded with software comprising computer executable instructions and when the software is executed (by the processor 720) it is operable to perform the operations described herein.

Figure 16:
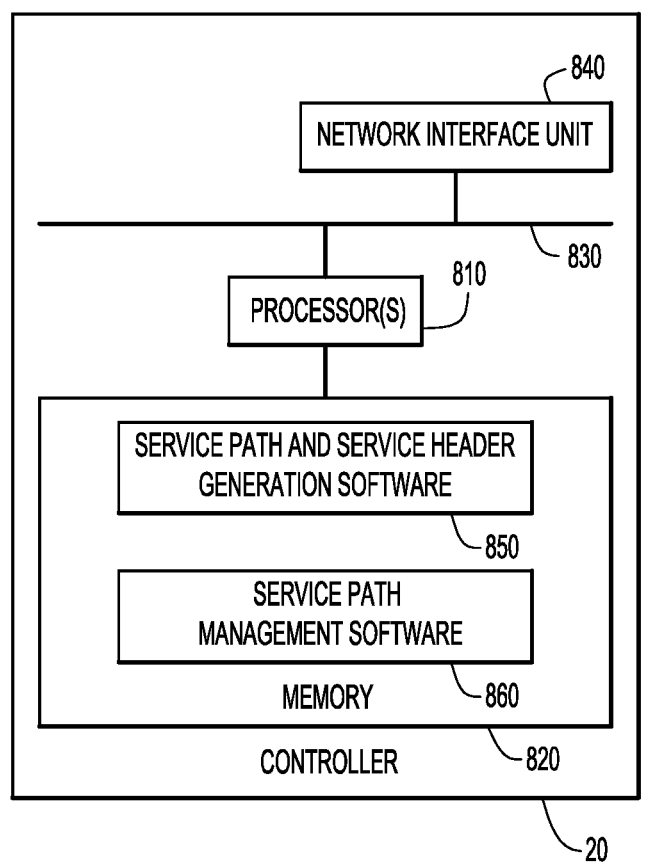
FIG. 16 is an example of a block diagram of a controller and/or network management station that is configured to perform the techniques presented herein.

Turning now to FIG. 16, an example block diagram is shown for a controller configured to perform the operations described herein for controller 20. It should be understood that a virtual controller would be a software-emulated or virtualized version of what is shown in FIG. 16, such as software running in a data center. The controller 20 includes one or more processors 810, memory 820, a bus 830 and a network interface unit 840. The processor 810 may be a microprocessor or microcontroller. The network interface unit 840 facilitates network communications between the controller 20 and the network nodes. The processor 810 executes instructions associated with software stored in memory 820. Specifically, the processor 810 stores service path and service header generation software 850 that, when executed by the processor 810, causes the processor 810 to perform the operations for the controller 20 and/or network management station 80 described herein with respect to FIGS. 1-14.

The memory 820 may comprise read only memory (ROM), random access memory (RAM), magnetic disk storage media devices, optical storage media devices, flash memory devices, electrical, optical, or other physical/tangible memory storage devices. In general, the memory 820 may comprise one or more tangible (non-transitory) computer readable storage media (e.g., a memory device) encoded with software comprising computer executable instructions and when the software is executed (by the processor 810) it is operable to perform the operations described herein.

Thus, the techniques presented herein may be embodied in a method, an apparatus and computer readable storage media, for example. In method form, the method involves, in a network comprising a plurality of network nodes each configured to apply one or more service functions to traffic that passes the respective network nodes in a service path, receiving at a network node an indication of a failure or degradation of a service function or application applied to traffic at the network node; generating data descriptive of the failure or degradation; determining a previous service hop network node at which a service function or application was applied to traffic in the service path; and communicating the data descriptive of the failure or degradation to the previous service hop network node.

In apparatus form, an apparatus is provided comprising a network interface unit configured to enable communications over a network, the network comprising a plurality of network nodes each configured to apply one or more service functions to traffic that passes through the respective network nodes; memory; and a processor coupled to the network interface unit and the memory, wherein the processor is configured to: receive at a network node an indication of a failure or degradation of a service function or application applied to traffic at the network node; generate data descriptive of the failure or degradation; determine a previous service hop network node at which a service function or application was applied to traffic in the service path; and communicate the data descriptive of the failure or degradation to the previous service hop network node.

In computer readable storage media form, one or more computer readable storage media are provided encoded with software comprising computer executable instructions and when the software is executed operable to: receive at a network node an indication of a failure or degradation of a service function or application applied to traffic at the network node; generate data descriptive of the failure or degradation; determine a previous service hop network node at which a service function or application was applied to traffic in the service path; and communicate the data descriptive of the failure or degradation to the previous service hop network node.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
   in a network comprising a plurality of network nodes each configured to apply one or more service functions to traffic that passes through the respective network nodes in a service path, receiving at a network node an indication of a failure or degradation of a service function or application applied to traffic at the network node;
   generating data descriptive of the failure or degradation;
   determining a previous service hop network node at which a service function or application was applied to traffic in the service path;
   communicating the data descriptive of the failure or degradation to the previous service hop network node;
   examining a service header of a received packet in which the packet is encapsulated to detect a state of one or more particular bits in the service header allocated to command the collection of debugging information associated with the service function or application applied to traffic at the network node;
   generating debugging or troubleshooting information in response to detecting a particular state of the one or more particular bits in the service header; and
   sending the debugging or troubleshooting information to a destination for processing.

2. The method of claim 1, wherein generating the debugging or troubleshooting information is performed without altering normal processing of traffic passing through the network node.

3. The method of claim 1, further comprising, using a computing device operating on the debugging or troubleshooting information collected at the destination, determining a last service hop that successfully applied a service function or application in the service path.

4. The method of claim 1, wherein examining further comprises examining the service header of the received packet to detect a state of a further one or more particular bits in the service header allocated to indicate that the packet is a synthetic packet injected into the service path for verification of packet forwarding through the service path, and further comprising:
   determining at the network node whether it is the last service hop in the service path; and
   when the network node is the last service hop in the service path, dropping the synthetic packet and sending to the destination a notification that the synthetic packet reached the last service hop in the service path.

5. The method of claim 4, further comprising injecting the synthetic packet into the service path on an on-demand or periodic basis.

6. The method of claim 1, wherein generating the data descriptive of the failure or degradation comprises generating metadata for the failure or degradation and including the metadata within the service header.

7. The method of claim 1, wherein determining the previous service hop network node comprises examining a context header in the service header, the context header allocated to contain previous service hop location information and which is populated by each network node along the service path so that the context header contains information identifying the location of the previous service hop network node at any point along the service path.

8. An apparatus comprising:
   a network interface unit configured to enable communications over a network, the network comprising a plurality of network nodes each configured to apply one or more service functions to traffic that passes through the respective network nodes in a service path;
a memory; and
a processor coupled to the network interface unit and the memory, wherein the processor is configured to:
receive at a network node an indication of a failure or degradation of a service function or application applied to traffic at the network node;
generate data descriptive of the failure or degradation;
determine a previous service hop network node at which a service function or application was applied to traffic in the service path;
communicate the data descriptive of the failure or degradation to the previous service hop network node;
examine a service header of a received packet in which the packet is encapsulated to detect a state of one or more particular bits in the service header allocated to command the collection of debugging information associated with the service function or application applied to traffic at the network node;
generate debugging or troubleshooting information in response to detecting a particular state of the one or more particular bits in the service header; and
send the debugging or troubleshooting information to a destination for processing.

9. The apparatus of claim 8, wherein the processor is configured to generate the debugging or troubleshooting information without altering normal processing of traffic passing through the network node.

10. The apparatus of claim 8, wherein the debugging or troubleshooting information enables a computing device at the destination to determine a last service hop that successfully applied a service function or application in the service path.

11. The apparatus of claim 8, wherein the processor is configured to examine the service header by examining the service header of the received packet to detect a state of a further one or more particular bits in the service header allocated to indicate that the packet is a synthetic packet injected into the service path for verification of packet forwarding through the service path, and wherein the processor is further configured to:
determine at the network node whether it is the last service hop in the service path; and
when the network node is the last service hop in the service path, drop the synthetic packet and send to the destination a notification that the synthetic packet reached the last service hop in the service path.

12. The apparatus of claim 11, wherein the processor is further configured to inject the synthetic packet into the service path on an on-demand or periodic basis.

13. The apparatus of claim 8, wherein the processor is configured to generate the data descriptive of the failure or degradation by generating metadata for the failure or degradation and including the metadata within the service header.

14. The apparatus of claim 8, wherein the processor is configured to determine the previous service hop network node by examining a context header in the service header, the context header allocated to contain previous service hop location information and which is populated by each network node along the service path so that the context header contains information identifying the location of the previous service hop network node at any point along the service path.

15. One or more non-transitory computer readable storage media encoded with software comprising computer executable instructions and when the software is executed operable to:
receive at a network node configured to apply one or more service functions to traffic that passes the network node in a service path, an indication of a failure or degradation of a service function or application applied to traffic at the network node;
generate data descriptive of the failure or degradation;
determine a previous service hop network node at which a service function or application was applied to traffic in the service path;
communicate the data descriptive of the failure or degradation to the previous service hop network node;
examine a service header of a received packet in which the packet is encapsulated to detect a state of one or more particular bits in the service header allocated to command the collection of debugging information associated with the service function or application applied to traffic at the network node;
generate debugging or troubleshooting information in response to detecting a particular state of the one or more particular bits in the service header; and
send the debugging or troubleshooting information to a destination for processing.

16. The computer readable storage media of claim 15, further comprising instructions operable to generate the debugging or troubleshooting information without altering normal processing of traffic passing through the network node.

17. The computer readable storage media of claim 15, further comprising instructions operable to:
examine the service header of the received packet to detect a state of a further one or more particular bits in the service header allocated to indicate that the packet is a synthetic packet injected into the service path for verification of packet forwarding through the service path;
determine at the network node whether it is the last service hop in the service path; and
when the network node is the last service hop in the service path, drop the synthetic packet and send to the destination a notification that the synthetic packet reached the last service hop in the service path.

18. The computer readable storage media of claim 17, further comprising instructions operable to inject the synthetic packet into the service path on an on-demand or periodic basis.

19. The computer readable storage media of claim 15, further comprising instructions operable to generate metadata for the failure or degradation and including the metadata within the service header.

20. The computer readable storage media of claim 15, further comprising instructions operable to determine the previous service hop network node by examining a context header in the service header, the context header allocated to contain previous service hop location information and which is populated by each network node along the service path so that the context header contains information identifying the location of the previous service hop network node at any point along the service path.

* * * * *